United States Patent [19]

Horita et al.

[11] Patent Number: 4,594,523
[45] Date of Patent: Jun. 10, 1986

[54] ARMATURE WINDING OF A SPLIT STATOR FOR A ROTARY ELECTRIC MACHINE

[75] Inventors: Tsuyoshi Horita; Yoji Nakatsuka; Kenzou Fujiwara; Norio Takeuchi; Yuji Nakanishi; Shigeru Murasato, all of Kobe, Japan

[73] Assignee: Mitsubishi Denki Kabushiki Kaisha, Tokyo, Japan

[21] Appl. No.: 643,185

[22] Filed: Aug. 22, 1984

[30] Foreign Application Priority Data

Sep. 17, 1983 [JP] Japan .................. 58-171571
Sep. 26, 1983 [JP] Japan .................. 58-179641

[51] Int. Cl.⁴ ............................................ H02K 15/00
[52] U.S. Cl. ..................................... 310/42; 310/43; 310/184; 310/259; 310/260; 29/596
[58] Field of Search ............... 310/42, 254, 258, 259, 310/179, 180, 184, 198, 216, 217, 218, 43, 260; 29/596

[56] References Cited

U.S. PATENT DOCUMENTS

| | | | |
|---|---|---|---|
| 2,424,299 | 7/1947 | Baudry | 310/51 UX |
| 3,426,224 | 2/1969 | Esters | 310/184 |
| 4,217,510 | 8/1980 | Detinko | 310/258 |
| 4,263,524 | 4/1981 | Diedrichs | 310/184 |

OTHER PUBLICATIONS

"Synchronous Machine", Kaga et al; Tokyo Denki Univ., 12/20/67; pp. 374+375.

*Primary Examiner*—R. Skudy
*Attorney, Agent, or Firm*—Leydig, Voit & Mayer, Ltd.

[57] ABSTRACT

This invention relates to an armature winding of a split stator for a rotary electric machine having a slotted core divided by at least two circumferentially-spaced split lines to facilitate the disassembly and assembly of the split stator. The armature coils crossing the split line of the split stator are divided to have heads at both ends of the stator core and provide half coils wound through the back unit of the stator frame such that these coils are mounted on both sides of the split line.

4 Claims, 13 Drawing Figures

ARMATURE WINDING OF A SPLIT STATOR FOR A ROTARY ELECTRIC MACHINE

BACKGROUND OF THE INVENTION

The present invention relates to an armature winding of a split stator for a rotary electric machine adapted to facilitate the connecting and disassembling of the split stator in a circumferential direction of the rotary electric machine.

When an a.c. rotary electric machine having an armature winding on a stator exceeds a transporting limit on large size, the stator is split in a circumferential direction. in order that it may be disassembled for transport even when sufficient space cannot be provided to axially insert or with a rotor, the stator is split for the purpose of installing at a field site, checking and maintaining the rotary electric machine.

Figure 1:
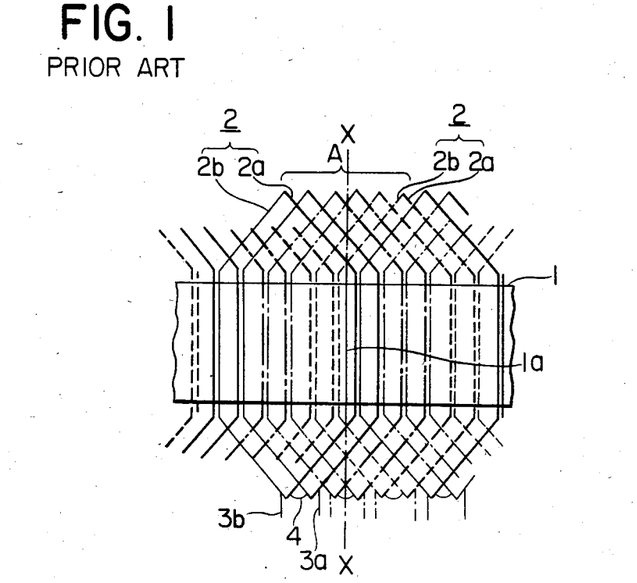
FIG. 1 is a sectional view showing the armature winding of a conventional split stator.

The armature winding of a conventional split stator is arranged as shown in a sectional view of the split stator in FIG. 1. In FIG. 1, the armature has a three-phase, two-layer lap winding formed of a hexagonal-shaped coils for a stator core having two slots for each pole and each phase. Numeral 1 designates a stator core, split in a split surface 1a. Characters X—X designate a split line of the stator. Numeral 2 designates an armature coil inserted into each slot of the stator core 1, the upper port coils 2a are designated by thick lines, and the lower port coils 2b are designated by thin lines. Numerals 3a and 3b designate lead wires of the starting end and finishing end of the coil, and the connecting wires are omitted in FIG. 1. Numeral 4 designates connecting wires between the adjacent armature coils 2 of the same phase.

In a factory for fabricating a rotary electric machine, the split stators are coupled to become a circle, the armature coils 2 are inserted into the respective slots of the stator core 1 and are connected. Thus, the rotor is inserted into and associated with the stator sections of the split stator, and the split stator is then tested in. When the test is finished, the stator is disassembled into units at the split lines for transportation. In this case, the armature coils 2 which cross the split line X—X are removed from the slots. In FIG. 1, six such coils in section A are thus removed.

In this manner, when the rotary electric machine in which the stator is split is assembled and associated at a field site, the armature coils 2 of the split stator that were removed when the stator was disassembled should be again inserted into the slots of the stator core 1.

Figure 2:
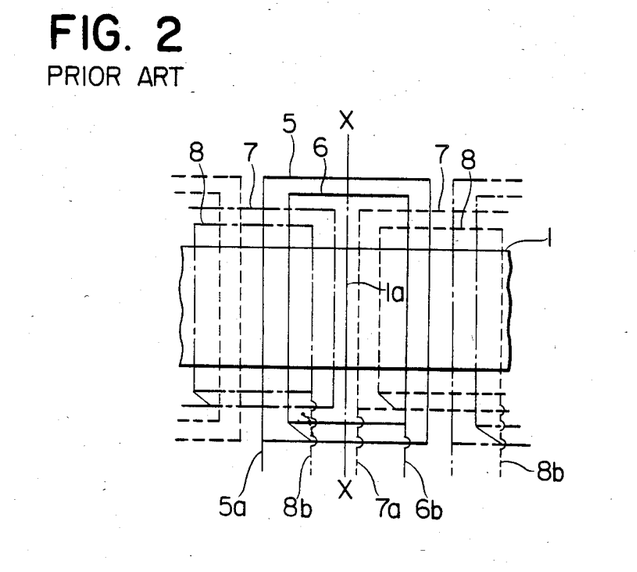
FIG. 2 is a winding view of split units showing an armature chain-winding of another example of a conventional split stator.

FIG. 2 shows a sectional view of the split stator of another conventional rotary electric machine having a three phase single-layer chain-winding and two slots for each pole and each phase. A stator core 1 is split at the split plane 1a. Numerals 5 to 8 designate armature coils, solid lines designate U-phase, broken lines designate V-phase and chain lines designate W-phase. Numerals 5a, 7a and 6b, 8b respectively designate the starting end and the finishing end of the coils, and the connecting wires are omitted.

In order to disassemble the split units of the stator of the armature winding of these chain winding coils, the armature coils 5, 6 which cross the split line X—X must first be removed from the slots. In installing them at a field site, the armature coils 5, 6 of the split units to be associated again must be inserted into the coupled stator core 1.

As illustrated and described in the examples above, when the split units of the conventional split stator with the armature winding are disassembled, any armature coil which crosses the split lines should be removed. When the split units of the split stator are then recoupled, the armature coils of the split units should be again inserted into the coupled stator core. However, the armature coils in both cases are insulated against a high voltage, and the insulation of the armature coil may be damaged whenever the wedges used to secure coils in the slots of the stator core 1 are removed and then attached. The removal and insertion of the armature coils from and into the slots of the stator core may damage the insulation. Further, a large amount of labor and time are required for every disassembling and assembling of the split stator.

It has been proposed as another conventional means for removing the armature coils of the split units of the split stator to allow the lower port coils of the armature coils crossing the split line to remain inserted and only the upper port coils of the armature coils to be removed. However, even this procedure will cause a certain amount of damage to the insulation of the armature coils and requires a large quantity of labor and time. Further, this procedure for removing the coils cannot be adopted in situations where the rotor cannot be axially inserted and removed.

SUMMARY OF THE INVENTION

It is therefore an object of the present invention to eliminate the above deficiency of the conventional machine and to provide an armature winding of a split stator for a rotary electric machine in which armature coils crossing the split line of a stator are divided into half coils having coil ends at both ends of the stator core. The coil ends extend radially and are fastened to connecting conductors which are wound through the back of the frame of the stator so that the stator can be disassembled at the split lines while the armature coils remain mounted in stator core slots without removal, thereby eliminating the damage to insulation of the armature coils.

BRIEF DESCRIPTION OF THE DRAWINGS

In the drawings, the same numerals depict the same or equivalent parts.

DESCRIPTION OF THE PREFERRED EMBODIMENTS

Figure 3:
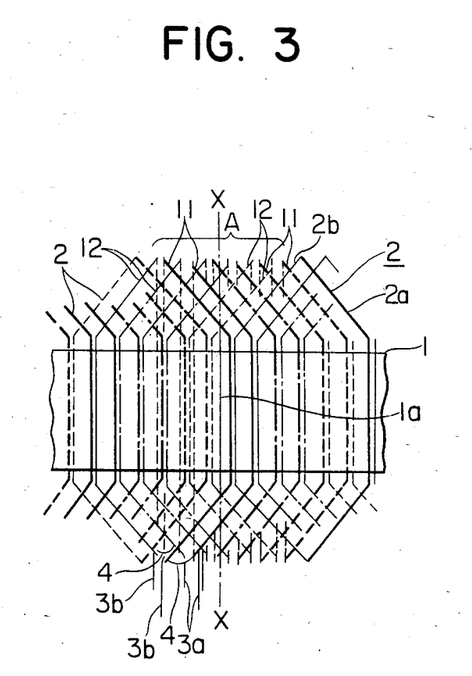
FIG. 3 is a sectional view of an embodiment showing the armature winding of a split stator in accordance with the present invention.
Figure 4:
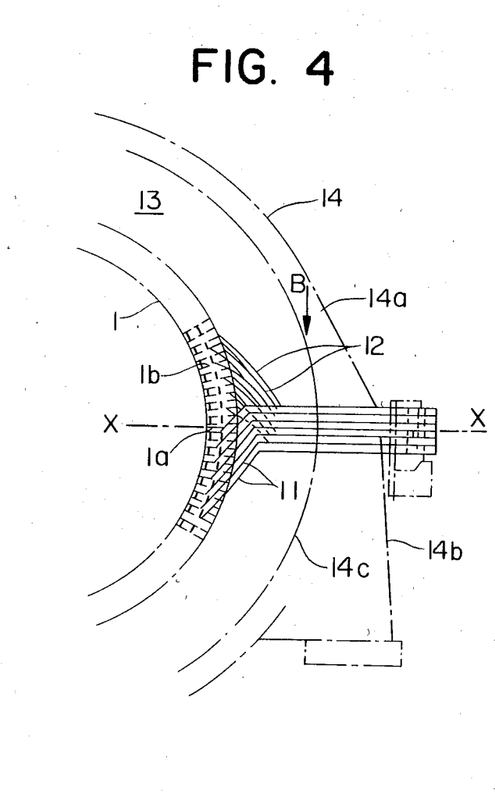
FIG. 4 is a front view showing the essential part of the armature winding of FIG. 3.
Figure 5:
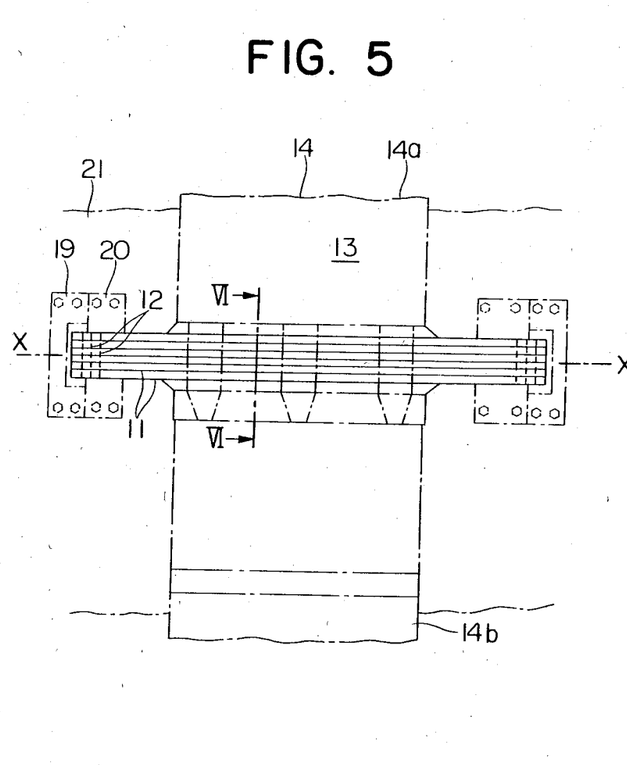
FIG. 5 is a side view showing the essential part of the armature winding of FIG. 3.
Figure 6:
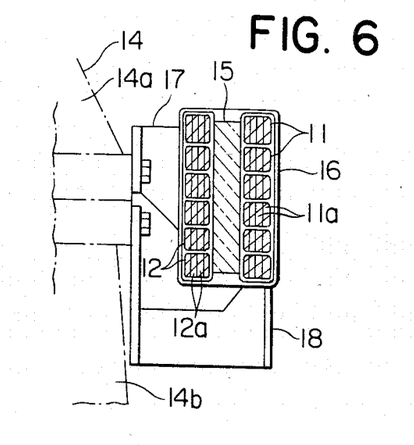
FIG. 6 is an enlarged sectional view along the line VI—VI in FIG. 5.

FIG. 3 is a sectional view of a split unit showing an embodiment of the armature winding of a split stator according to the present invention illustrating a three-phase, two-layer lap winding in two slots for each pole and each phase. Numerals 1, 1a, 2, 2a, 2b, 3a, 3b and 4 designate the same parts as those in the conventional armature winding in FIG. 1. For convenience, the connections between the coil ends and adjacent coils for only one phase (U-phase) are shown in FIG. 3. The armature coils crossing the split line X—X are divided into half coils 11 and 12 to be connected to connecting conductors indicated by the vertical dotted lines.

Various views of the embodiment showing the divided armature coils 2 and their half coils are illustrated in FIGS. 4-7 in which numeral 13 designates a stator and numeral 14 designates a stator frame for holding the stator core 1, The coil coil ends of the half coils 11 and 12 are inserted into the slots and radially externally extended to a position radially outside the back 14' of the stator frame 14. The conductors 11a and 12a connected to the coil ends of the half coils 11 and 12 extend along the back 14' of the frame longitudinally of the stator core from one end to the other end so as not to interfere with the assembling and disassembling of the stator.

Figure 7:
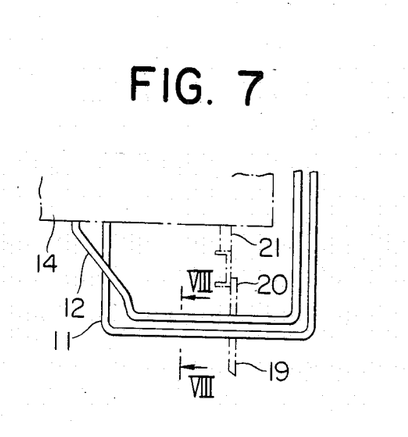
FIG. 7 is a plan view as seen from an arrow B in FIG. 4.
Figure 8:
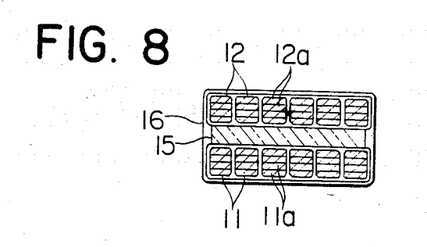
FIG. 8 is an enlarged sectional view along the line VIII—VIII in FIG. 7.

The the currents flow through the connecting conductors 11a and 12a in opposite directions. The conductors 11a and 12a are secured together by an insulating spacer 15 and an insulating tape 16, as shown in sectional views in FIGS. 6 and 8, so as to reduce the leakage of magnetic flux, and rigidly held by coil supports 17 and 18 to the stator frame 14. Numerals 19 and 20 designate coil supports for supporting the coil ends mounted on an end enclosure 21 as shown in FIG. 7.

In the embodiment described above, the armature winding shown has a two-layer winding in two slots for each pole and each phase, but may also be applied to multi-layer windings in other than two slots.

Figure 9:
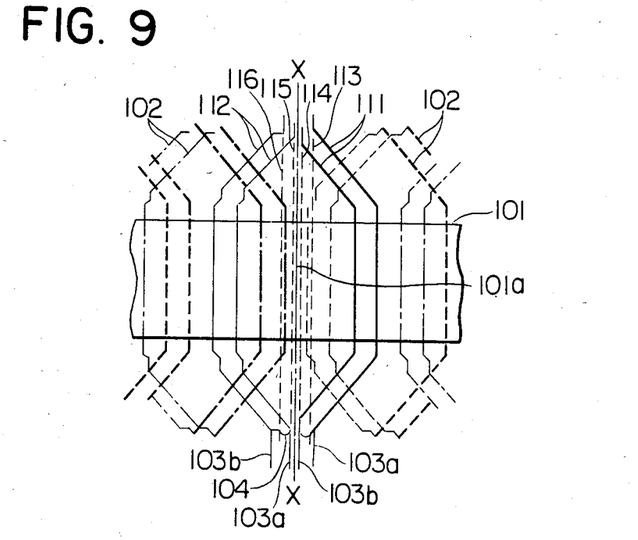
FIG. 9 is a sectional view of another embodiment of the armature winding of a split stator according to the present invention.

FIG. 9 is a sectional view of a split unit showing another embodiment of the armature winding of a split stator according to the present invention. This armature winding is formed of three-phase, single-layer winding hexagonal coils in two slots for each pole and each phase. Numeral 101 designates a stator core, numeral 101a designates a split plane of split line X—X of the stator core, 103a, 103b designate starting end and finishing end, and 104 designates connecting wires of the adjacent armature coils of the same phase. The armature coils 102 crossing the split line X—X are divided into half coils 111 of one side and 112 of the other side.

The half coils 111 and 112 are attached, respectively, to connecting conductors 113, 114 and 115, 116 and wound to the back 117' of the stator frame.

Figure 10:
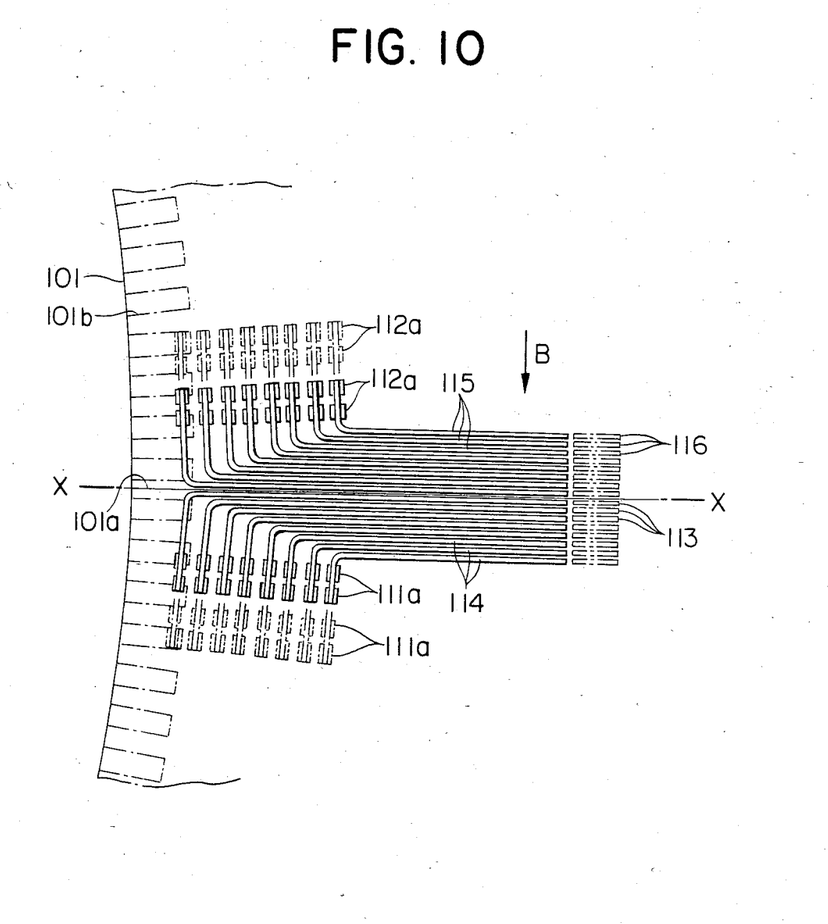
FIG. 10 is a front view showing the essential part of the armature winding of FIG. 9.
Figure 11:
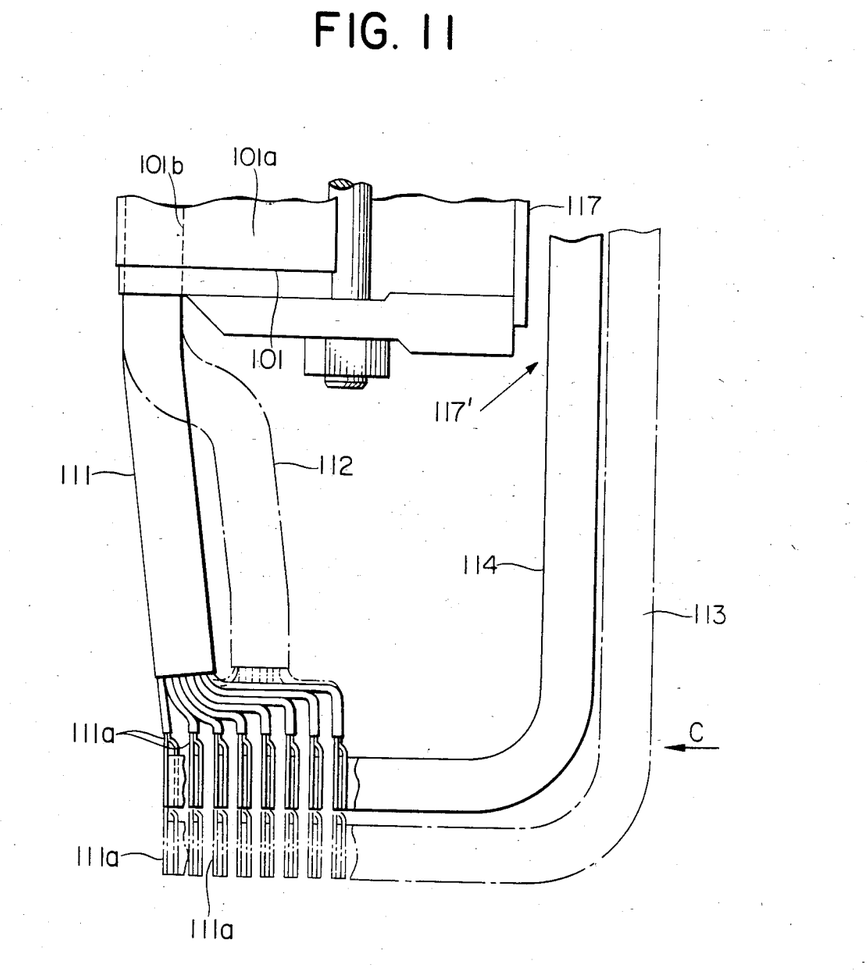
FIG. 11 is a plan view along the split line X—X in FIG. 10.
Figure 12:
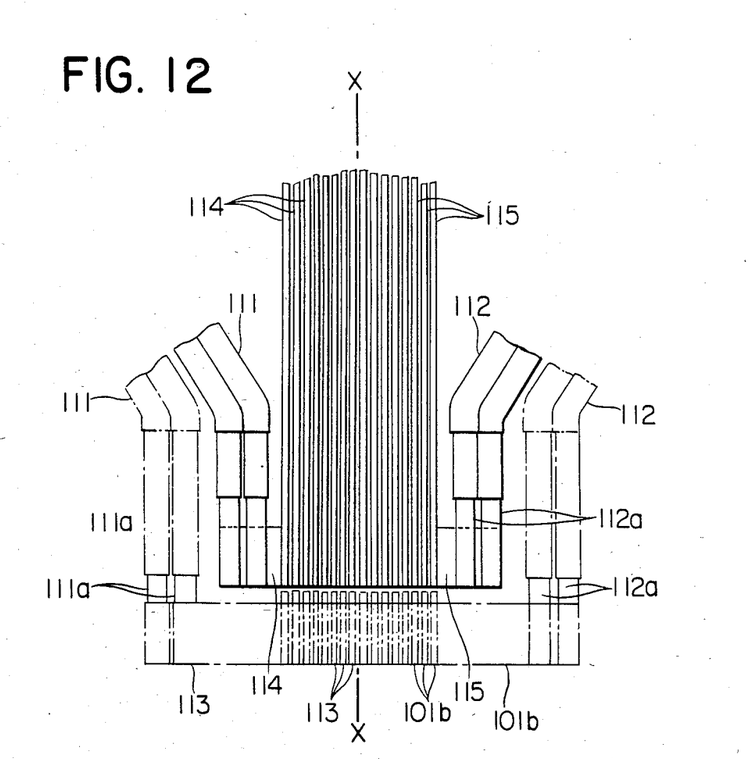
FIG. 12 is a view of the winding as seen in a direction C in FIG. 11.
Figure 13:
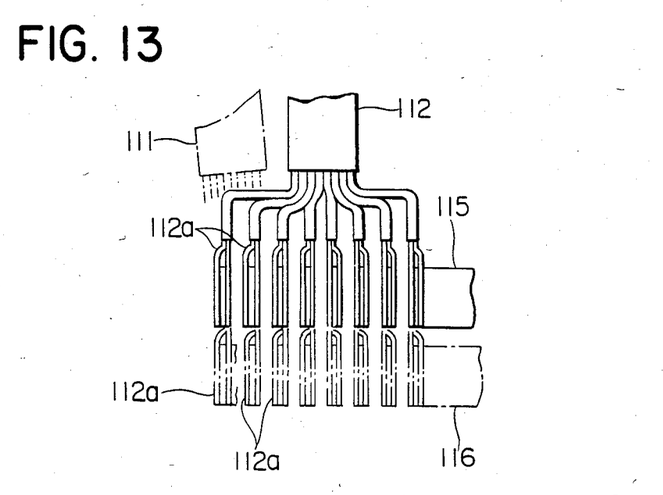
FIG. 13 is a plan view of the connecting unit of the head of the coils of the other side in FIG. 11.

Various views of the embodiment showing the divided armature coils and the connecting conductors are illustrated in FIGS. 10-12. Numeral 117 designates a stator frame for holding the stator core 101, and the frame is divided along the split line X—X. The coil ends of the half coils 111 and 112 are inserted into the slot 101b and extend outwardly. A plurality of connecting conductors 113, 114 and 115, 116 extend to the back of the stator frame 117 and are connected.

The groups of connecting conductors 113 and 114 and the groups of connecting conductors 115 and 116 are insulated between the conductors, by taping, and both groups are enclosed and held to reduce the leakage of magnetic flux. The groups of the connecting conductors 113 to 115 are rigidly supported through supporting pieces (not shown) to the stator frame 117.

In the embodiments described above, the armature winding has a single layer winding in two slots for each pole and each phase. However, the armature winding may be in other than two slots and may be a two-layer winding.

In the embodiments described above, a three-phase winding has been described. However, the winding may be more than three phases.

Further, in the embodiments described above, a hexagonal-shaped armature coil of a single-layer winding has been described. However, this invention may be applied to the armature coil of a single-layer chain winding.

The division of the stator is not limited to two split lines, but the invention may also be applied to a stator split into more than two.

In the embodiments described above, the slots of the stator core are not included to the axial direction. However, these slots may also be oblique slots inclined at a pitch of one slot.

In the embodiments described above, the connection of the coil conductors 111a and 112a to the connecting conductors 113 to 116 is performed by soldering. However, the connection may also be carried out by bolt clamping.

Further, in the embodiments described above, the connecting conductors for connecting the coils of one and the other sides to the coil conductor ends pass around the back of the stator frame. However, the connecting conductors may also pass through the back of the stator core in the stator frame.

According to the present invention as described above, the armature coils crossing the split line of the stator are divided have heads at both ends of the stator core and form half coils. These half coils are mounted on both sides of the split stator and connected to connecting conductors which pass along the back of the stator frame. Therefore, the stator can be readily disassembled and assembled at the split units without removing the armature coils of the splits units and without damaging the armature coils and the disassembly and assembly may be accomplished in a short time, thereby remarkably improving the workability of installing, checking and maintaining.

What is claimed is:

1. An armature winding of a split stator having an annular core, slots on the inside surface of said core, and a frame outside of said core, said slotted core being divided by at least two circumferentially-spaced split lines to facilitate the disassembly and assembly of said split stator, said armature winding comprising armature coils in the slots of said core connected to provide poles and arranged to provide a plurality of said armature coils divided by each of said split lines, said divided armature coils being split into half coils, each having a conductor in one of said slots and coil ends at heads of said coils at both ends of said stator core, and means for connecting the coils ends of said half coils so as to allow the stator core to be disassembled without removing armature coils from the slots of the split stator.

2. The armature winding as claimed in claim 4 wherein said connecting means includes a connecting conductor extending along the back of the stator frame connecting the ends of half coils on one side of one split line and the ends of half coils on the other side of said one split line.

3. An armature winding of a split stator for a rotary electric machine according to claim 1 wherein said connecting means includes clamps for the ends of said half coils.

4. An armature winding of a split stator for a rotary electric machine according to claim 3 wherein said connecting means includes an insulating spacer for groups of said half coils spaced from said clamps.

* * * * *